July 15, 1924.
B. M. FINE
1,501,653
CUT-OFF MECHANISM
Original Filed Oct. 17, 1921   2 Sheets-Sheet 1
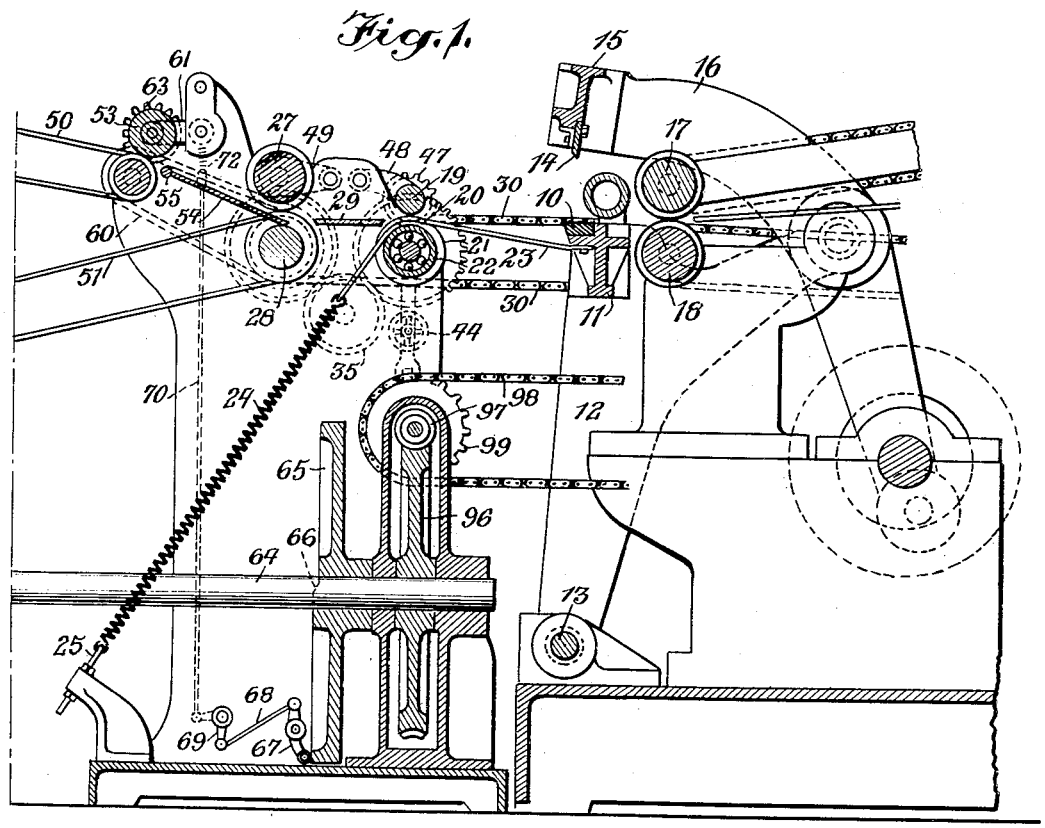
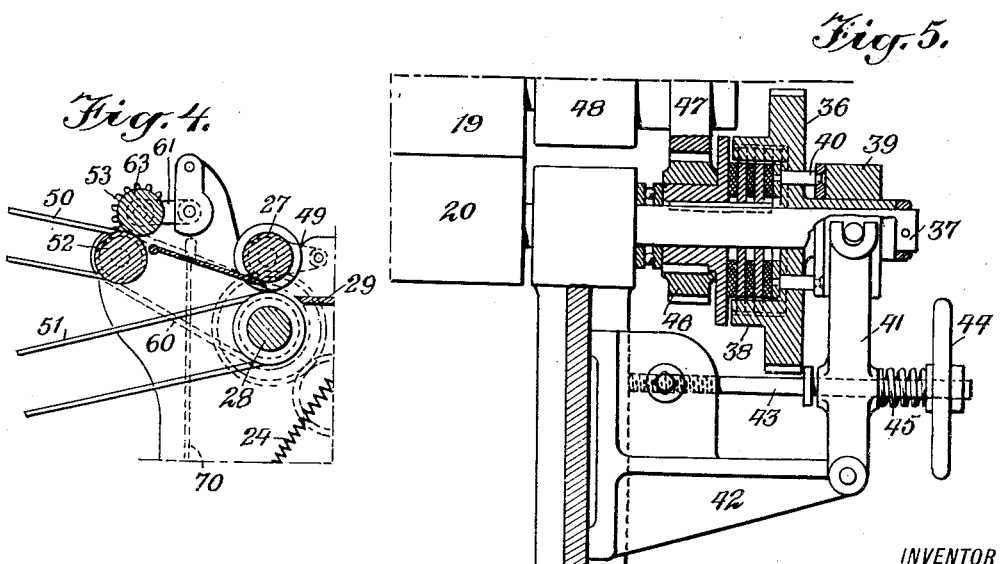
INVENTOR
Bernard M. Fine
BY
Dean, Fairbank, Albright & Hirsch
ATTORNEYS July 15, 1924.

B. M. FINE

CUT-OFF MECHANISM

Original Filed Oct. 17, 1921   2 Sheets-Sheet 2

1,501,653

INVENTOR
Bernard M. Fine
BY
Dean, Fairbank, Albright & Hirsch
ATTORNEYS

Patented July 15, 1924.

1,501,653

UNITED STATES PATENT OFFICE.

BERNARD M. FINE, OF PHILADELPHIA, PENNSYLVANIA, ASSIGNOR TO SAMUEL M. LANGSTON COMPANY, OF CAMDEN, NEW JERSEY, A CORPORATION OF NEW JERSEY.

CUT-OFF MECHANISM.

Original application filed October 17, 1921, Serial No. 508,082. Patent No. 1,460,059, dated June 26, 1923. Divided and this application filed June 19, 1922. Serial No. 569,396.

*To all whom it may concern:*

Be it known that I, BERNARD M. FINE, a citizen of the United States, and resident of Philadelphia, in the county of Philadelphia and State of Pennsylvania, have invented certain new and useful Improvements in Cut-Off Mechanism, of which the following is a specification.

This application is a division of my prior and copending application, Serial No. 508,082, filed October 17th, 1921, (Patent 1,460,059, granted June 26, 1923) and the invention relates to machines for cutting continuously advancing sheet material into sections and delivering them for stacking.

I do not wish to be limited to any particular kind of sheet material, although certain features of my invention have in mind sheet material of such general properties as that employed in the manufacture of composition shingles. Among the important features and objects of my invention are the complete and accurate severing of the sheet into sections without interfering with the uniform and continuous advancement of the sheet, the elimination of slack in the sheet at the cut off mechanism, the supporting and conveying of the sections from the cut off mechanism to the feed rolls, the advancing of each section at a faster speed than that of the body immediately upon its severance, the guiding or directing of the sections to separate conveyors, and the reversing of the position of the guiding means after a predetermined number of sheets have been delivered to a conveyor. These and various other features will be pointed out more particularly in connection with the following detailed description of one of many forms which my invention may assume. I do not wish to be limited to the specific form illustrated, except in so far as it is defined in the appended claims.

In the accompanying drawings:—

Fig. 1 is a vertical longitudinal section of a portion of a machine embodying my invention.

Fig. 4 is a figure similar to a portion of Fig. 1, but showing the guiding means in the opposite limiting position, and Fig. 5 is a sectional detail on the line 5—5 of Fig. 3, but on a somewhat larger scale.

Figure 2:
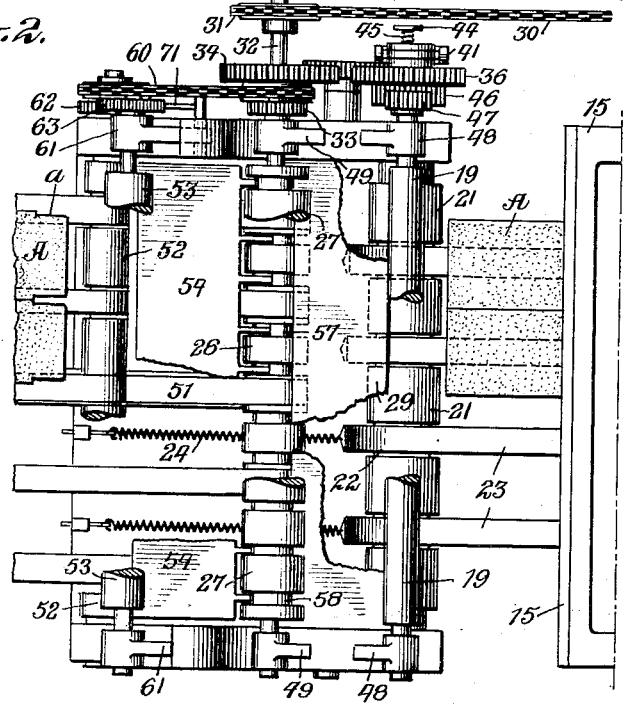
Fig. 2 is a top plan view of the portions of the machine shown in Fig. 1, parts being broken away.
Figure 3:
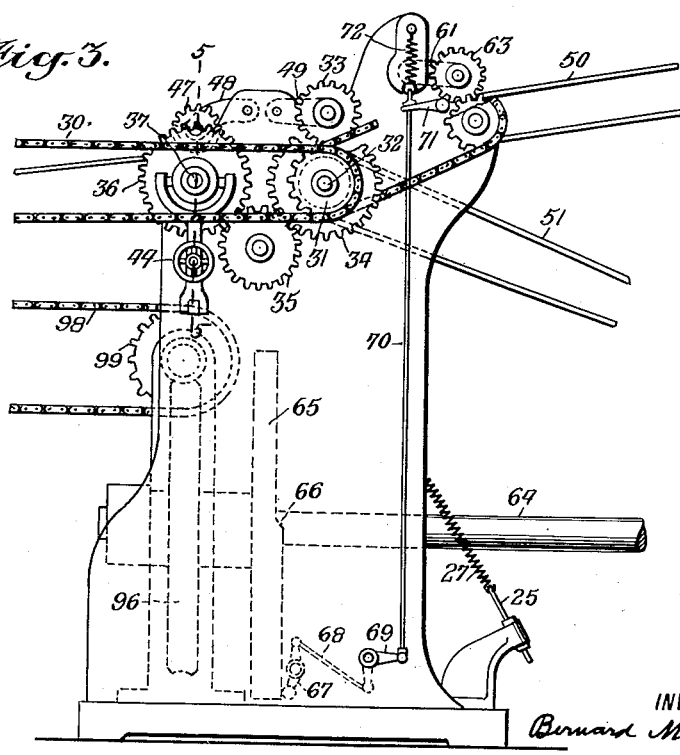
Fig. 3 is a side elevation of a portion of the machine shown in Fig. 1, but viewed in the opposite direction.

The machine as illustrated may be designed and built independent of any particular machine for the manufacture, slitting, scoring or other treatment of the material, and in many respects independent of any particular mechanism for stacking the sheet.

So far as certain features of the invention are concerned, it is preferable, if not essential, that the cut off mechanism be of such a type that it does not interfere with the continuous and uniform delivery of sheet material. This is preferably accomplished by employing a cut off mechanism which will move back and forth in the general direction of travel of the sheet, and will cut while traveling with the sheet and at approximately the same speed. A preferred cut off mechanism is that illustrated and claimed in the Langston Patent 1,359,076, issued November 16th, 1920. Reference is to be had to said patent for a more complete disclosure of the construction and operation. The cut off mechanism includes a cutter 10 mounted on a transverse beam 11 which latter is carried by arms 12 mounted to swing about a stationary axis 13. A second cutter 14 is carried by another transverse beam 15, which latter is carried by arms 16 pivoted to the arms 12. The cut off mechanism is operated by a crank connected to the ends of the arms 16 so as to give the cutter 10 a back and forth movement in the general direction of travel of the material, and an approximately elliptical movement to the cutter 14 and intersecting the path of movement of the cutter 10 during the movement of the latter with the material.

Any suitable means may be employed for continuously and uniformly advancing the sheet between said cutters in the direction of the arrow. Merely for purposes of illustration I have shown a pair of driven feed rolls 17—18 for this purpose. The advancing end of the sheet enters between a pair of superposed feed rolls 19—20 spaced just beyond the limiting position of the cut off mechanism. The lower feed roll 20 is made up of a series of axially spaced material gripping or engaging portions 21 (see Fig. 2) and between these portions 21 there are intermediate portions 22 of reduced diameter and preferably in the form of idler rolls free to rotate in either direction in respect to the sheet-engaging portions 21. These idler rolls may be in the form of sleeves or collars mounted on roller bearings.

For supporting the material between the cutter and the feed rolls 19—20, for guiding the sheet to these rolls, preventing the end from dropping down between the cutter and rolls, and for acting as conveyors, I provide a plurality of flexible strips or belts 23. These may each have one end secured to the cutter 10 or the supporting beam of the latter, and each may be of a width substantially equal to the width of the idlers 22 and may extend between the feed rolls 19—20 without engaging with the upper feed roll 19. As the two feed rolls rotate about stationary axes and the cutter is movable back and forth in respect to these feed rolls, I provide means for keeping these belts, conveyors or supports taut, or under tension. Such means may include a series of springs 24 each secured to the end of its corresponding belt section, and to an adjusting and securing connection 25 on the base or other stationary part of the machine. Thus, as the cutter 10 moves back and forth the portions of the belts 23 between the cutter and the feed rolls will remain taut and the belts will move back and forth between the cutting rolls by the rotation of the idlers 22, first in one direction and then in the other. This movement will not interfere with the proper gripping and advancing of the material between the feed roll 19 and the portions 21 of the lower feed roll. Furthermore, the cut off mechanism and the feed rolls are so positioned in respect to each other and the cut off mechanism operates to make sections of such length that the advancing end of the sheet enters between the feed roll 19—20 before the cutting action takes place, and therefore the return movement of the cutter and belts does not interfere with the continuous advancement of the cut off sections after they have entered between the feed rolls 19—20.

If no lengthwise slitting of the sheet has taken place and the cut off section is therefore of a single piece of full width of the sheet, the number, width and spacing of the belts 23 is comparatively unimportant. In that case it is only essential that there be enough of these belts, and that they be of such width as will properly support the sheet between the cutter and the feed rolls. If the sheet be slitted lengthwise into strips before the cut off action takes place, the cut off section will include a plurality of separate pieces A, and in that event the belts 23 should be properly spaced in respect to these separate pieces. In the manufacture of composition shingles it is customary to cut notches a at the corners of the shingles, as indicated in Fig. 2, and these notches may be cut even though the sheet is not slitted lengthwise to make individual shingles. If any such portion of the sheet is cut therefrom, either in the making of shingles or any other articles, it is preferably that the belts 23 be so positioned that the small pieces may fall from the cut off section and between adjacent belts 23. As shown, the belts 23 are so positioned as to correspond in number to the shingles A, and each belt comes intermediate the side edges of the corresponding shingle so that the notches a come between adjacent belts.

Beyond the feed rolls 19—20 are another pair of superposed feed rolls 27—28 which receive the cut off sections from the feed rolls 19—20. The sections may be guided across from one pair of feed rolls to the other on a supporting platform 29, or in any other suitable manner, but the two pairs of rolls are preferably so spaced in respect to each other that the sheet sections enter between the rolls 27 and 28 before they leave the rolls 19—20. If desired the slitting means may be mounted between the rolls 19—20 and the rolls 27—28.

In order to facilitate the operation of the stacking mechanism and prevent the possibility of one section overlapping or interfering with another, I provide means whereby the transverse cut is opened up by a spacing apart of the cut off sections. This is accomplished by operating the feed rolls 27—28 at a higher speed of surface travel than that of the rate of travel of the body of the sheet, determined for instance, by the speed of surface travel of the rolls 17—18. The rolls 19—20 engage with the advancing end of the sheet both before and after the cut off action, and therefore I provide means whereby the speed of these rolls varies so as to prevent any slipping or grinding action of them on the material and to prevent them from retarding the movement of the cut off sections. The driving mechanism is shown as including a drive chain 30 operated from the same source of power as that which advances the body of the sheet. This chain engages a sprocket 31 on the shaft 32 of the feed roll 28. This shaft has a gear meshing with the gear 33 of the upper feed roll 27 so as to drive the two rolls at the same surface speed. The shaft 32 also has a gear 34 meshing with an intermediate gear 35 transmitting power to a gear 36 on the shaft 37 of the lower feed roll 20. The gear 36 is not directly keyed to the shaft 37 but is connected thereto by a suitable slip friction clutch. One form which this clutch may assume is illustrated in Fig. 5. The gear 36 has an annular flange 38 enclosing a multiple disk clutch, each alternate disk being held against rotation in respect to the flange and the remaining disks being held against rotation in respect to the shaft. A collar 39 is slidable on the shaft and carries push rods 40 projecting through the gear 36 to press the disks together to give the desired frictional resistance and capability of slipping. The pressure may be accurately adjusted for instance by means of a yoke arm 41 pivoted to a bracket 42 on the frame of the machine and engaging trunnions on the collar 39. A rod 43 engages this arm and carries a hand wheel 44 and spring 45 so that by rotation of the hand wheel any desired resilient pressure may be applied to the clutch and the slipping permitted only when the resistance exceeds the predetermined amount. The shaft 27 has a gear 46 meshing with a gear 47 on the shaft of the upper roll 19. The gear transmission ratio is such that when there is no slipping in the clutch the feed rolls 19—20 will travel with the same surface speed as the feed rolls 27—28, this speed being materially higher than that at which the sheet of uncut material is advanced. The friction of the clutch is so adjusted that as soon as the advancing end of the sheet enters between the rolls 19—20, the slipping takes place in the clutch and the rolls 19—20 rotate with approximately the same surface speed as the sheet. In other words, the speed of these rolls is held down by the resistance which the main body of the sheet offers to an increase in speed. The instant that the cut off action takes place this resistance terminates, and then slipping of the clutch may terminate and the rolls 19—20 will immediately increase their speed to that of the rolls 27—28. Thus, when the cut off section enters between the rolls 27—28 it will be traveling at the surface speed of the latter and there will be no slipping of the sheet material between these rolls. The rolls 19—20 rotate at one speed while engaging with the sheet before the end is cut off, and rotate at a higher speed as soon as the section is cut off. Thus the instant that the cut off action takes place, the cut off section jumps forward to widen the gap between it and the advancing end for the next successive section. To take care of variations in the thickness of the sheet material, the upper feed rolls 19 and 27 are preferably mounted for such vertical movement as is necessary to take car of the variations in thickness of the sheet. As shown, the shaft of the upper roll 19 is mounted in a pair of pivoted arms 48, and the shaft of the roll 27 is mounted in a pair of pivoted arms 49. If the slip clutch be tightened sufficiently, the rolls 19—20 will hold constant speed and slip on the sheet until cut the off takes place. This is permissible with some sheet materials and therefore for such materials the clutch may be omitted and the rolls 19—20 directly geared for the proper constant speed of rotation.

My improved machine is particularly designed for high speed operation and building up stacks each containing a predetermined number of sheets. To accomplish this object I provide two separate stack supports and deliver a predetermined number of sheets to one stack and then the same number to the other stack, thus providing time for the operator to remove one and permit the delivery mechanism to return to starting position while the other stack is being piled up. The delivery mechanism includes two conveyors 50—51, each preferably in the form of a set of endless belts. Means are provided for guiding the sheets to one conveyor for a predetermined interval and then to the other conveyor for a similar interval. The feed roll 28 preferably serves as one of the supporting rollers for the conveyor belts 51, and a second pair of feed rolls 52—53 are provided, the lower one 52, serving as one of the supporting rollers for the conveyor belts 50. The feed rolls 52—53 are disposed beyond the rolls 27—28 in the general direction of travel of the material, and preferably at a slightly higher elevation. The conveyor belts 50 are arranged above the conveyor belts 51, and preferably the two diverge, the former being slightly inclined upwardly, and the latter slightly inclined downwardly. Means are provided for preventing or permitting the delivery of the sheets from the feed rolls 27—28 to the feed rolls 52—53. This obviously acts to permit or prevent the delivery of the sheets on to the conveyor belts 51. Such a guiding means is illustrated as a plate 54 secured to a pivot 55 just in advance of the line of tangency of the feed rolls 52—53, and presenting fingers 56 projecting through between the rolls 27—28. The lower roll 26 has a series of spaced portions of reduced diameter for receiving the belts 51 and between adjacent belts there are additional portions 57 of reduced diameter registering with corresponding portions 58 of reduced diameter in the upper roll 27. The fingers 56 project into the passages between the rolls formed by these reduced diameter portions 57 and 58, and are so positioned and of such length that they may be raised or lowered and come either above or below the line of tangency of the material engaging portions of the two rolls 27—28. When the guide plate 54 and its fingers are in the lower position, as indicated in Fig. 1, all of the cut off sections or sheets as they pass between the rolls 27—28 will be guided along the upper surface of the plate to the feed rolls 52—53 and will be carried away by the conveyor 50. With the guide plate 54 in its opposite limiting position, in other words, its rest position, as shown in Fig. 4, the end of the fingers comes above the line of tangency, and all of the cut off sections or sheets will pass beneath the guide plate 54 and will be carried away on the lower conveyor 51. The feed rolls 52—53 are driven with substantially the same surface speed as the rolls 27—28, and by any suitable driving mechanism. As shown, the shaft 32 of the lower feed roll 28 has a sprocket transmitting power through a chain 60 to a sprocket on the shaft of the lower roll 52. The upper roll 53 has its shaft mounted in pivoted arms 61 to permit of variation in the thickness of the material passing between the rolls, and the two rolls have intermeshing gears 62—63 for driving the upper roll 53. So far as the operation is concerned, the upper conveyor might be a single belt of the desired width, but this is not necessary, and preferably a plurality of narrow belts are employed, each engaging a corresponding reduced diameter portion of the roll 52. To permit the proper operation of the fingers 56, the lower conveyor 51 is made up of the separate spaced belts.

As previously noted, the belts 23 are so positioned that they come intermediate of the edges of the separate pieces of the cut off section, so that cut out portions may fall between. Preferably the belts 50—51 are arranged alternately to the belts 23. In other words, they are so spaced that each piece or shingle A is supported along its two opposite edges as illustrated in Fig. 2. This prevents the side edges from curling down during the comparatively longer run along these conveyors.

For controlling and timing the operation of the guide plate 54 I provide a control shaft 64 with controlling mechanism for reversing the position of the guide 54 after each half revolution of the shaft. As shown, the shaft carries a cam disk 65 having one half of its circumferential track spaced from the other half by shoulder or inclined portions 66. The motion may be transmitted from the cam to the guide plate 54 in various different ways, that illustrated including a pivoted lever 67 mounted to engage the working face of the cam, and connected by a link 68 to a bell crank lever 69. The latter is connected by a rod 70 to an arm 71 connected to the guide plate 54 or to the pivotal support for the latter. A coil spring 72 normally tends to lift the rod 71 and thus hold the operating end of the lever 67 against the cam. The cam, during a half revolution holds the rod down and keeps the guide 54 in its lowermost position. When the lever 67 rides off the shoulder 66, the spring is permitted to lift the guide plate 54 to its upper position, as shown in Fig. 4, and the cut off sections or sheets may pass beneath the plate. Thus, the guide plate is positively held in lowered position, and the spring acts only to hold it in rest position when it is not supporting the weight of any sheets passing over it.

The two conveyors 50 and 51 deliver to two separate stacks or stacking mechanisms but as these form no portion of my present invention they have not been illustrated. They may be such as is shown in my prior application of which this is a division. I reserve the right to here illustrate them should it appear to be advisable.

Having thus described my invention, what I claim as new and desire to secure by Letters Patent is:

1. A machine for cutting sheet material into sections, including an oscillatory cutter movable back and forth in the general direction of travel of the material, a pair of feed rolls spaced from said cutter to receive the end of the sheet before the cutter severs the end section from the body of the sheet, and supporting members secured to said cutter and movable back and forth therewith and extending between the axes of said feed rolls, said feed rolls permitting free movement of said supporting members, but acting to grip and positively advance the cut-off sections and prevent the return movement of said sections with said supporting members.

2. A machine for cutting sheet material into sections, including an oscillatory cutter movable back and forth in the general direction of the travel of the material, a shaft having rolls rigid therewith and idlers loose thereon, a set of belts secured to said cutter and supported by said idlers and movable back and forth with said cutter, means for holding said belts taut, and a second shaft having means cooperating with said rolls to grip the advancing end of the sheet beyond the cutter and prevent return movement of the cut-off section with said belts.

3. A machine for cutting sheet material into sections, including a cutter movable back and forth in the general direction of the travel of the material, a pair of superposed shafts having feed rolls for receiving the advancing end of the sheet and exerting pull thereon during the action of the cutter on the sheet, a series of spaced belt sections secured to said cutter and extending between said shafts and axially spaced from the sheet-gripping portions on said feed rolls, and extensible spring means connected to the ends of said belt sections for holding them taut during their back and forth movement with the cutter.

4. A machine for cutting sheet material into sections, including a cutter movable back and forth in the general direction of the travel of the material, a pair of rotatable members including material-engaging sections for receiving therebetween and advancing the cut-off sections, intermediate idler sections of smaller diameter rotatable back and forth in respect to the material-engaging sections, flexible supporting strips secured to said cutter and extending between the axes of said rotatable member and engaging said idler sections, and means for holding said strips taut, whereby they move back and forth over said idler sections during the back and forth movement of said cutter.

5. A machine for cutting sheet material into sections, including a cutter movable back and forth in the general direction of the travel of the material, a pair of feed rolls for receiving and advancing the cut-off sections, and including spaced material-engaging sections, and intermediate idler sections rotatable in respect to said feed rolls and flexible supporting strips secured to said cutter and extending between the axes of said feed rolls and engaging said idler sections.

6. A machine for subdividing continuously advancing sheet material into sections, including a pair of superposed feed rolls, a cut off mechanism movable back and forth in the general direction of travel of the material and operating to sever the material after the advancing end has entered between said rolls, and means tending to rotate said rolls at a higher surface speed than that of the travel of the advancing material and including slip friction connections whereby the surface speed of said rolls may be substantially that of the advancing material prior to the severance of the latter from the body of the sheet.

7. A machine for subdividing continuously advancing sheet material into sections, including a pair of superposed feed rolls, a cut off mechanism operating to sever the material after the advancing end has entered between said rolls, and means tending to rotate said rolls at a higher surface speed than that of the travel of the advancing material and including slip friction connections whereby the surface speed of said rolls may be substantially that of the advancing material prior to the severance of the latter from the body of the sheet.

8. A machine for subdividing continuously advancing sheet material into sections, including a pair of feed rolls for receiving the advancing end of the sheet, mechanism operating to cut off the advancing end after the latter enters between said rolls, and operating means for said rolls normally tending to rotate them at a higher surface speed than the speed of travel of the sheet, and including slip friction connections permitting said rolls to rotate with a surface speed not materially greater than that of the sheet prior to the action of the cut off mechanism.

9. A machine for subdividing sheet material into sections, including a pair of feed rolls for engaging with and continuously advancing a sheet of material at a substantially constant speed, a second pair of feed rolls engaging with and operating to advance the cut off sections of said sheet and at a higher surface speed than that of the sheet, an intermediate pair of feed rolls, means for driving the last mentioned rolls at the speed of the second mentioned rolls and including a slip friction permitting the third mentioned rolls to rotate at the surface speed of the first mentioned rolls, and cut off mechanism between the first mentioned rolls and the third mentioned rolls.

10. A machine for subdividing sheet material into sections, including a cut off mechanism, a pair of feed rolls engaging the body portion of the sheet, a second pair of feed rolls rotating at a higher surface speed and engaging the cut off sections of the sheet, and an intermediate pair of rolls engaging with the advancing end of the sheet before the cut off action, and means for operating said intermediate rolls at the speed of the first mentioned rolls before the cut off action and at the speed of the second mentioned rolls after the cut off action.

11. A machine for subdividing sheet material into sections, including cut off mechanism for acting on a continuously advancing sheet to cut it into sections, feed rolls for the cut off sections, means operating said feed rolls at a higher surface speed than that of the body portion of the advancing sheet, intermediate feed rolls and a variable speed driving mechanism therefor, whereby the cut off section is advanced to the first mentioned feed rolls at a higher speed than the rate of advancement of the sheet immediately after the said section is severed from the body of the sheet.

12. A machine for subdividing continuously advancing sheet material into sections, including a cutter movable back and forth in the general direction of travel of the sheet, a pair of superposed feed rolls, the lower roll having portions of reduced diameter, supporting strips secured to said cutter and extending between said rolls at said points of reduced diameter and movable back and forth between said rolls with the movement of the cutter, and driving mechanism for said rolls, including a slip friction clutch normally tending to rotate said rolls at a higher surface speed than the speed of travel of the body of the sheet.

13. A machine of the class described, including a pair of superposed feed rolls for receiving the advancing end of the sheet material, cut off mechanism for severing the advancing end after it enters between said rolls, a second pair of superposed rolls for receiving and advancing the cut off section, means for driving the second mentioned rolls and slip friction driving connections from the second mentioned rolls to the first mentioned rolls, whereby the first mentioned rolls may rotate at lower surface speed than that of the second mentioned rolls.

14. A machine of the class described, including a pair of superposed feed rolls for receiving the advancing end of a sheet of material, cut off mechanism for severing said advancing end after it enters between said rolls, and a second pair of superposed rolls for receiving and advancing the cut off section, the lower roll of each pair having spaced portions of reduced diameter, and flexible conveyor belts engaging with the portions of reduced diameter of both rolls.

15. A machine of the class described, including a pair of superposed feed rolls for receiving the advancing end of a sheet of material, cut off mechanism for severing said advancing end after it enters between said rolls, and a second pair of superposed rolls for receiving and advancing the cut off section, the lower roll of each pair having spaced portions of reduced diameter, and flexible conveyor belts engaging with the portions of reduced diameter of both rolls.

16. A machine of the class described, including a pair of superposed feed rolls for receiving the advancing end of a sheet of material, cut off mechanism for severing said advancing end after it enters between said rolls, and a second pair of superposed rolls for receiving and advancing the cut off section, the lower roll of each pair having spaced portions of reduced diameter, and separate sets of flexible conveyor belts engaging with the portions of reduced diameter, one of said belts advancing the material to the first mentioned pair of rolls and the other advancing the material from the second pair of rolls.

17. A machine of the class described, including a pair of superposed feed rolls for receiving the advancing end of a sheet of material, cut off mechanism for severing said advancing end after it enters between said rolls, and a second pair of superposed rolls for receiving and advancing the cut off section, the lower roll of each pair having spaced portions of reduced diameter, a set of flexible conveyor belts engaging with the portions of reduced diameter of the lower roll of the first mentioned pair and movable back and forth to separately advance successive sections, and a set of flexible conveyor belts engaging with the portions of reduced diameter of the lower roll of the second mentioned pair and movable continuously in one direction to deliver the cut off sections from said last mentioned rolls.

18. A machine of the class described, including a pair of superposed feed rolls for receiving the advancing end of a sheet of material, cut off mechanism for severing said advancing end after it enters between said rolls, and a second pair of superposed rolls for receiving and advancing the cut off section, the lower roll of each pair having spaced portions of reduced diameter and flexible conveyor belts engaging with the portions of reduced diameter of both rolls, and a separate support intermediate of said pairs of rolls.

19. A machine for subdividing into sections continuously advancing sheet material, including a pair of superposed feed rolls, a cut-off mechanism operating to sever the material after the advancing end has entered between said rolls, and means for rotating said rolls at substantially the speed of the advancing material before the cut-off action, and at a high speed after the cut-off action to space the cut-off section from the balance of the sheet and continuously increase the width of such spacing until the advancing end of the body of the sheet reaches said rolls.

20. A machine for severing successive sections from the advancing end of a sheet of material, including means for advancing the sheet at a substantially uniform rate, a pair of feed rolls for engaging the advancing end of the sheet and rotating at substantially the speed of travel of the sheet, means for cutting off the portion of the sheet engaging said rolls and in advance of the latter, and means for rotating said rolls at a higher speed after the cut-off to space the cut-off section from the balance of the advancing sheet and continuously increase the width of such spacing until the advancing end of the remainder of the sheet reaches said rolls.

Signed at Philadelphia in the county of Philadelphia and State of Pennsylvania this 12th day of June A. D. 1922.

BERNARD M. FINE.